Figure 1:
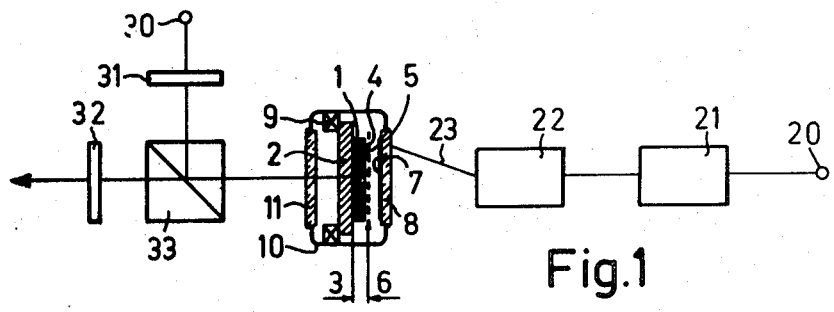

United States Patent
Donjon et al.

[11] 3,792,259
[45] Feb. 12, 1974

[54] ELECTRO-OPTIC DEVICE COMPRISING AN OPTIC IMAGE RELAY AND METHOD OF MANUFACTURING SAME

[75] Inventors: Jacques Donjon, Yerres; Jean-Pierre Hazan, St. Maur; Gerard Joseph Marcel Marie, L'Hay Les Roses, all of France

[73] Assignee: U.S. Philips Corporation, New York, N.Y.

[22] Filed: Mar. 28, 1972

[21] Appl. No.: 238,836

[30] Foreign Application Priority Data
Mar. 31, 1971   France .......................... 7111319

[52] U.S. Cl. ........................... 250/213 VT, 350/150
[51] Int. Cl. ......................................... H01j 39/12
[58] Field of Search ........... 250/213, 225; 350/150; 313/103 R, 103 A

[56] References Cited
UNITED STATES PATENTS

| | | | |
|---|---|---|---|
| 3,499,157 | 3/1970 | Satake | 250/213 VT |
| 3,609,002 | 9/1971 | Fraser | 350/150 |
| 3,637,931 | 1/1972 | Donjon | 350/150 |
| 3,601,468 | 8/1971 | Dailey | 350/150 |
| 3,449,583 | 6/1969 | Eden | 350/150 |
| 3,252,000 | 5/1966 | McNaney | 350/150 |
| 3,700,902 | 10/1972 | Buchan | 350/150 |

*Primary Examiner*—James W. Lawrence
*Assistant Examiner*—D. C. Nelms
*Attorney, Agent, or Firm*—Frank R. Trifari

[57] ABSTRACT

An electro-optical device including a writing beam, a reading beam and an optic relay comprising a plate of a material having double refraction.

According to the invention, a direct voltage is applied between the faces of the plate, the information being written by modulation of the writing beam.

Application in information processing, display of data and the projection of images.

4 Claims, 4 Drawing Figures

ELECTRO-OPTIC DEVICE COMPRISING AN OPTIC IMAGE RELAY AND METHOD OF MANUFACTURING SAME

The present invention relates to an electro-optic device comprising: at least a first source of a first light radiation, means for projecting the said radiation, at least a second source of a second light radiation, means for polarizing and projecting the said second light radiation, and an optic image relay constituted by an evacuated enclosure having at least one window which is transparent to the said light radiations, by a layer which is photo-sensitive to the said first radiation, by a plate having electro-optic effect brought at a temperature near its Curie point and presenting a double refraction which is variable as a function of the potential difference existing between its faces, a first electrode which is electrically conductive and optically transparent to the said second light radiation being disposed against the said plate and a second electrode being placed on the opposite side in the proximity of the said plate.

An optic relay of this type is described in the Canadian application Ser. No. 118.174, British application Ser. No. 33059-71 Japanese application Ser. No. 52854-71, U.S. application Ser. No. 162.565 filed July 14, 1971 for "Optic relay for scanning by means of a light beam" filed in the name of applicant.

The invention also relates to the application of the device permitting the addition and the subtraction of optic images.

In the above-mentioned patent application, the photosensitive layer may be constituted, according to a first embodiment, by a photocathode. In this case, the second electrode facilitating the application of a potential difference between the faces of the plate is constituted by a grid placed at a few tens of microns from the second face of the plate, which second face is then covered with a secondary emission layer, the saturation emission coefficient of which is higher than 1, with the interposition of an insulating mirror which reflects the second light radiation. When a light beam impinges upon the photocathode, it emits electrons which bombard the above secondary emission layer, under the influence of an accelerating voltage of 200 to 2,000 Volts applied between the photocathode and the above grid, the focusing being obtained by the proximity effect.

In a second embodiment, the photosensitive layer is constituted by a photoconductive layer which becomes conductive under the influence of the first light radiation. Said layer is deposited on the second face of the plate with the interposition of an insulating mirror which reflects the second light radiation. The second electrode is then constituted by a conducting layer which is transparent to the first light radiation and is deposited on the photoconductive layer.

In these two alternatives, the only object of the light beam is to produce the electric contact between the second electrode and the corresponding point of the second face of the plate, thus playing a part of flying short circuit, the image signal or the information signal being applied between the two electrodes. The first and second light beams may be of the same nature, that is to say having substantially identical spectra in the visible range. It may also relate to light beams having different wave lengths, for example, in the ultraviolet and visible spectra.

In all these devices, the writing on the second face of the plate of a charge image automatically erases the image which was written previously, no matter what the differences are existing between the two writings.

According to the present invention, the electro-optic device comprising: at least a first source of a first light radiation, means for projecting the said radiation, at least a second source of a second light radiation, means for polarizing and projecting the said second light radiation and an optic image relay constituted by an evacuated enclosure having at least one window which is transparent to the said light radiations, by a layer which is photosensitive to the said first radiation, by a plate having an electro-optic effect brought at a temperature in the proximity of its Curie point and presenting a double refraction which is variable as a function of the potential difference existing between its faces, a first electrode which is electrically conductive and optically transparent to the said second light radiation being disposed against the said plate and a second electrode being placed on the opposite side in the proximity of the said plate, is characterized in that modulation means of the said first light radiation are disposed before its incidence on the said photosensitive layer, the said electrodes being connected to a direct voltage source.

The invention also relates to a method of manufacturing a device as described above for the algebraic addition of optic images, characterized in that the images transported by the first light radiation are written on the said photosensitive layer, each of the optical images being transformed into a charge image observed by means of a second light radiation by variation of the double refraction.

Figure 2:
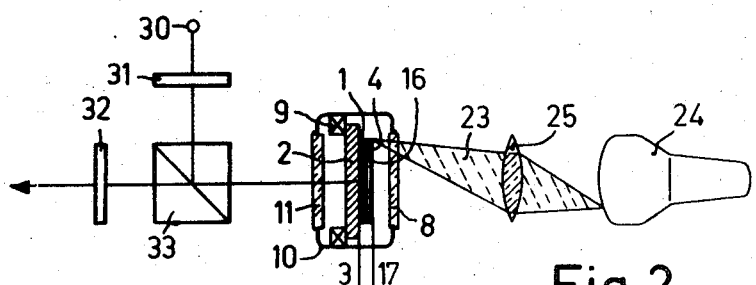
Figure 3:
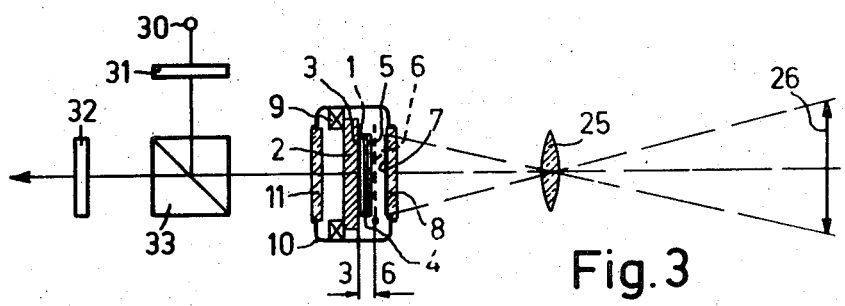

The invention will be better understood during the following description of particular embodiments with reference to the figures, which show:

FIG. 1, a first embodiment of the invention in which the photosensitive layer is a photoconductive layer scanned by a modulated light beam, FIG. 2, a second embodiment of the invention in which the photosensitive layer is a photoconductive layer scanned by a modulated light beam, FIG. 3 a third embodiment of the invention in which the photosensitive layer is a photocathode on which an image is projected.

Figure 4:
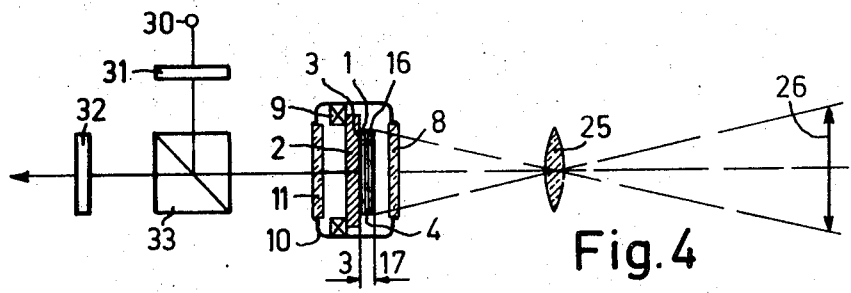

FIG. 4, a fourth embodiment of the invention in which the photosensitive layer is a photoconductive layer on which an image is projected.

In FIG. 1, the optic image relay is provided in an evacuated enclosure 10 which has two windows 8 and 11, respectively. Said windows may be transparent to the radiations of different wave lengths. A photocathode 7 is deposited on the window 8. Opposite to the cathode 7 is placed the plate 1 having variable double refraction which may be a monocrystal of deuterated diacid potassium phosphate. Said plate is covered by an insulating mirror 4 and by a secondary emission layer 5 the saturation emission coefficient of which is higher than 1. A grid 6 is placed between the photocathode 7 and the layer 5 at a distance of a few tens of microns. The outer face of the plate 1 is covered by a transparent conductive layer 3 and is glued on a transparent support 2, for example of calcium fluoride or barium fluoride, which has on the one hand the property of being isotropic and on the other hand of having a good thermal conductivity. The plate is brought at a temperature near its Curie point by means of a cooling member 9.

In the first embodiment shown, the image projected on the photocathode is written sequentially by means of a light beam emanating from a source 20 which may be, for example, a laser source, said beam being modulated by an electro-optic cell 21 and set into scanning motion by a light deflector 22. Said assembly may moreover be replaced by a flying spot tube associated with an objective, the modulation of the light being then realised by the application of the signal voltage between the cathode and the Wehnelt of the tube while superimposing a suitable direct voltage.

According to the invention, a direct voltage which may be positive or negative is applied between the transparent conductive layer 3 and the grid 6. The operation of the optic relay is not symmetric according to the polarity. When the grid 6 is negative relative to the target, the secondary emission coefficient of the layer 5 is very low and the deposited charges are negative and practically equal to the number of electrons emitted by the photocathode 7 under the effect of the light beam 23. When the grid 6 is positive relative to the target, the secondary emission coefficient $\eta$ of the layer 5 is higher than 1 and for simplification it may be considered that the charges deposited on the bombarded face are positive charges proportional to ($\eta - 1$). So a layer 5 must be chosen which presents a secondary emission coefficient which varies very little in the interval of accelerating voltages of the electrons at the level of the target, of which interval the width is of the order of a hundred volts. As long as the potential differences between the two faces of the plate 1 are lower than the direct voltage applied between the two electrodes 3 and 6, the electric charges deposited in each point are proportional to the product of the luminous flux by the duration of its passage in each point. In this manner an addition function is obtained by accummulation of charges deposited during each scan.

In FIG. 2, elements identical to those of FIG. 1 have the same reference numerals. The photosensitive element is constituted by a photoconductive layer 16 which is deposited on the insulating mirror 4. The photoconducting layer is covered by a conductive layer 17 which is transparent to the radiations issued by the source which in this case is a flying spot tube 24 associated with an objective 25, which source may be, as above, a laser source. The direct voltage is applied between the two transparent conductive layers 3 and 17. The arrival of the luminous flux on the photoconductor 16 creates electron-hole pairs which modify the charge state of the plate on the side of the mirror, as in the case of FIG. 1; as long as the potential differences between the two faces of the plate 1 are lower than the direct voltage applied between the two electrons 3 and 17, the electric charges deposited in each point are proportional to the product of the luminous flux by the duration of its passage.

In FIG. 3, elements identical to those of FIG. 1 have the same reference numerals. The image projected on the photocathode may originate from any device: scene 26 directly projected by means of an objective 25, image formed on the screen of a cathode tube and also projected by means of an objective, figure obtained in coherent light and which may be an image, a Fourier transform or a hologram.

In FIG. 4, elements identical to those of FIG. 2 have the same reference numerals. The image projected on the photoconductive layer may originate from any device, as in the case of FIG. 3.

In the case of FIGS. 3 and 4, as long as the potential differences between the two faces of the plate are lower than the direct voltage applied between the two electrodes 3 and 6 or 3 and 17, the electric charges deposited in each point are proportional to the product of the luminous flux arriving at said point by the exposure time. In this manner an integrating function is obtained by accummulation of charges deposited during the exposure.

In the embodiments of FIGS. 1 to 4 it is sufficient, to erase the written picture, to expose the photosensitive layer 7 or 16 and simultaneously remove the voltage applied between the two electrodes 3 and 6 or 3 and 17. The functioning of the system is then equivalent to the writing of a zero signal according to the functioning described in the above patent application. It is possible to use for the erasing a second light beam which illuminates simultaneously all the points of the photosensitive layer or the same optic scanning as for the writing in the case of FIGS. 1 and 2. When said scanning is of the random type, a selective erasing may be obtained while directing the non-modulated beam 23 only on the desirable points. When the scanning is of the recurrent type, the selective erasing may be obtained while adding an on-off modulation of the beam.

It is possible to add on the target the charges corresponding to several successive images thereby increasing the ratio between the level of the recurrent components and the levels of the non-recurrent components of the various images. The average image of several successive images is thus realized. As a possible application may be mentioned: the augmentation of the signal-to-noise ratio of images having a important noise level, by integration of several successive images; other example: the display of elements common to several images corresponding to the smoothing of a scene in different conditions (different angles of shooting).

The reading of the information recorded in the optical image relay is done, as in the said patent application, by observation of the plate or by projection of the image of said plate while using, as shown in FIGS. 1 to 4, a light beam emitted by a source 30 which traverses a polarizer 31, is reflected on the dielectric mirror 4 and traverses the analyser 32, the separator 33 controlling the incident and reflected beams. When said separator 33 is polarized, it also plays the part of the elements 31 and 32. It is known that the image thus obtained, the luminosity of which depends only upon the power of the source 30, may be projected on a screen of large dimensions.

It is also possible to realize with the said optical image relay the subtraction of images. Said subtraction is done as follows: The plate being not charged initially, two successive series of images are formed on it. Between the two series, the polarity of the voltage applied between the two electrodes 3 and 6 or 3 and 17 is inverted. Thus a distribution of charges is obtained which is equal to the difference between the sums of the charges corresponding to the two series of images. In the case where a photocathode and a grid 7 are used, however, the ratio between the efficacies of the deposit of the positive and negative charges should be taken into account, which ratio is equal to ($\eta - 1$), where $\eta$ represents the secondary emission coefficient of the layer 5 during the sequence where the potential of the grid 6 is higher than that of the target. In order to take said factor into account, it is sufficient to suitably control the average intensity of the light beam for each writing sequence. Said mode of functioning permits, for example, of effecting the subtraction of two images, that is to say to eliminate all their identical parts (for example, fixed echos in radar).

It is to be noted that it is possible to amplify the received luminous flux while introducing in the optic relay an amplifier comprising a photocathode and a luminescent material as described in the above mentioned patent application. In the case of the first and third embodiments, it is also possible to amplify the electron beam while introducing a micro-channel multiplier as described in the above-mentioned patent application.

When the optic image relay is exposed to coherent light, the device for the optical information processing may be used which is described in the earlier mentioned application in the name of applicant for "Apparatus for optical information processing"; on the track of the reading light beam is placed a phase transformer which introduces a phase shift equivalent to the addition, in each point, of a constant signal of a sign opposite to that of the image signal. As in the earlier mentioned application no. said phase transformer may be constituted by a device exterior of the optic relay, such as a compensator or an electro-optical cell, or even may be formed integral with the crystalline plate of the optic relay; it is sufficient, for this purpose in the case of the subtraction of images to choose a uniform exposure for one of the two writing frequencies. A particularly remakable mode of functioning and in accordance with that described in the earier mentioned application is that for which the introduced constant phase shift is such that the average transmission of the assembly, in amplitude, is zero, facilitates cancellation of the zero order of diffraction in the Fourier transform of the image. A second remarkable mode of functioning is that for which the introduced constant phase shift is equal in absolute value, and of opposite sign, to the phase shift of the most illuminated written image point. The image observed upon reading is then a negative of the image projected on the photosensitive layer.

As the electro-optic effect used upon reading does not destroy the coherence of the light, the optic image relay described in the present invention permits the transformation of any image with a direct or inverted filter which may be used for the optic information processing with coherent or incoherent light. It also permits the transformation of any image in a positive or negative image of coherent light or of incoherent light having a spectrum different from that of the original image.

What is claimed is:

1. A method of algebraically adding images in an optic image relay of the type wherein an image pattern optically projected on a photosensitive layer by a first source of light radiation is converted thereby into an electrical pattern on an electrically biassed electro-optic plate interrogated by a second source of radiation, comprising the steps of first projecting an image pattern on the photosensitive layer with the radiation level of the first source of light radiation and the electrical bias level on the electro-optic plate having intensities sufficient to produce a partially induced double refraction in the electro-optic plate, and repeating the first step a plurality of times.

2. A method as claimed in claim 1, further comprising the step of reversing the electrical bias level on the electro-optic plate and then exposing the photosensitive layer to a plurality of second image patterns whereby the induced double refraction in the electro-optic plate corresponds to the difference between the first and second image pattern.

3. A method as claimed in claim 2, wherein the first pattern on the photosensitive layer is spatially unmodulated during one of the two writing sequencies at a value corresponding to an induced double refraction equal, in absolute value, to the maximum double refraction induced at the brightest point during the other sequence, whereby the negative image corresponding to said other sequence is produced.

4. A method as claimed in claim 2, wherein the first pattern on the photosensitive layer is spatially unmodulated during one of the two writing sequencies at a value corresponding to an induced double refraction equal, in absolute value, to the induced average double refraction during the other sequence, whereby a zero average transmission, in amplitude, of the second light radiation is obtained and the zero order of diffraction in the Fourier transform of the image which may be formed with said second radiation is eliminated.

* * * * *